United States Patent [19]

Dietzsch et al.

[11] Patent Number: 4,662,561
[45] Date of Patent: May 5, 1987

[54] HEATER FOR INSTALLATION ON THE FLOOR OR IN THE SIDE WALLS OF A MOTOR VEHICLE

[75] Inventors: Kurt Dietzsch, Leonberg-Eltingen; Hans-Dieter Oess, Stuttgart, both of Fed. Rep. of Germany

[73] Assignee: Sueddeutsche Kuehlerfabrik Julius Fr. Behr, Stuttgart, Fed. Rep. of Germany

[21] Appl. No.: 749,268

[22] Filed: Jun. 27, 1985

[30] Foreign Application Priority Data

Jul. 5, 1984 [DE] Fed. Rep. of Germany ....... 3424673
May 8, 1985 [DE] Fed. Rep. of Germany ....... 3516444

[51] Int. Cl.⁴ ............................................. B60H 1/02
[52] U.S. Cl. ............................. 237/12.3 B; 165/170; 165/41
[58] Field of Search ............ 165/170, 41, 53, 42; 237/12.3 R, 12.3 B, 12.3 C, 69, 43

[56] References Cited

U.S. PATENT DOCUMENTS

| 3,174,228 | 3/1965 | Smith, Jr. ............... | 237/8 R X |
| 3,246,689 | 4/1966 | Remde et al. ........... | 165/170 X |
| 4,159,709 | 7/1979 | Palazzetti ............... | 165/170 X |
| 4,300,720 | 11/1981 | Baier et al. ............ | 237/12.33 X |

Primary Examiner—Henry A. Bennet
Attorney, Agent, or Firm—Schwartz, Jeffery, Schwaab, Mack, Blumenthal & Evans

[57] ABSTRACT

Disclosed is a heater for installation on the floor or in the side walls of a motor vehicle. The heater installation comprises a first rigid plate and a second rigid plate which is firmly joined to the first rigid plate. One plate comprises a plastic material. In addition, a channel for a liquid medium is disposed between the plates and has at least one indentation therein. The heater also has an inflow pipe and an outflow pipe, wherein the channel extends from the inflow pipe to the outflow pipe.

19 Claims, 10 Drawing Figures

HEATER FOR INSTALLATION ON THE FLOOR OR IN THE SIDE WALLS OF A MOTOR VEHICLE

BACKGROUND OF THE INVENTION

The invention relates to a heater for installation on the floor or in side walls of a motor vehicle.

A heating system disposed on the floor of a motor vehicle, in which the heater comprises a block of pipes and ribs, as well as lateral header compartments into which the pipes discharge, is known from German Utility Model No. 16 50 455. This heating system was intended as the sole heater for a motor vehicle, and heat exchangers completely of metal and having high heat transfer coefficient were accordingly provided. The surface heat exchangers for the floor of a motor vehicle which are known from this utility model have the disadvantages of a relatively high manufacturing cost and relatively high weight, however, because they are entirely of metal. Furthermore, a cover plate must be provided in order to protect the ribs and prevent soiling of the heat exchanger.

Presently, motor vehicle heating systems are designed completely differently, because the heater is usually located in a heater housing between the dashboard and the firewall, and a flow of air is heated in the heater and introduced into the passenger compartment. In order to attain an effective heating capability, however, these systems require the operation of a blower, which, on the one hand, causes a perceptible draft, and, on the other, produces a considerable amount of noise.

Heating plates for the floor heating system of a motor vehicle are also known from German Offenelgungsschrift No. 19 62 665. These plates are made substantially of rubber, and are interspersed with channels that can be connected to the coolant circulation of the motor vehicle. Heat exchangers of this type have not be successful, however, because on the one hand they lack the necessary strength and rigidity, and on the other hand, the thermal conductivity of the rubber material is inadequate.

SUMMARY OF THE INVENTION

It is accordingly the object of the present invention to devise a heater of the above-mentioned type for installation on the floor or in side walls of a motor vehicle, which is structurally simple and inexpensive to manufacture, enables high heat transfer and has good strength characteristics.

In accordance with the above object, there has been provided a heater for installation on the floor or in the side walls of a motor vehicle, comprising: a first rigid plate; a second rigid plate firmly joined to the first rigid plate, wherein at least one of the plates comprises a plastic material; at least one channel for a liquid medium, disposed between the plates and including at least one indentation in at least one of the first and second plates; an inflow pipe; and an outflow pipe, wherein the channel extends from the inflow pipe to the outflow pipe.

The substantial advantages of the heater according to the invention are:

(1) that it comprises two plates which are very simple to manufacture and are very easily joined to one another;

(2) that only a relatively small volume of water in the heater is required for a good heating performance;

(3) that the heaters are very flat in shape; and (4) that these heaters are suitable both as the sole means of vehicle heating and as a supplementary heating source in addition to a conventional vehicle heating system.

Furthermore, no blower is needed for effective heating of the passenger compartment by these heaters; the thermal radiation is entirely adequate.

According to an advantageous further embodiment, at least one of the plates has, on its side facing the other plate, a number of projections on which the other plate is supported. The multiplicity of support points produces a very rigid structure despite the thinness of the walls of the plates embodying the heater.

According to a further advantageous embodiment, a number of indentations extending parallel are provided, which terminate in distributing or collecting chambers disposed on the end. For a particularly favorable embodiment in terms of the tools required for manufacturing the plates, and for the use of a uniform type of plate, it is advantageous that both plates have the same arrangements of indentations and are joined to one another in mirror-image fashion.

The cross section of the channels formed by the indentations may be circular, elliptical, or oval. As needed, either many conduits located quite close together and each spaced apart from the next by a distance that merely equals the wall thickness, or a lesser number of conduits located far apart from one another and spaced apart by distance that is substantially greater than the wall thickness may be provided.

The wall thickness of the plates embodying the heater may be approximately 0.25 mm to 1.5 mm. Wall thicknesses of 0.8 to 1.0 mm are considered to be particularly suitable. A particularly simple method for joining the two plates provides that they be joined together at the parting planes by welding. The feed and return tubes, which are connected to the inflow and outflow pipes, are likewise advantageously of plastic and are joined to these pipes by a welding process. High-pressure crosslinked polyethylene has proved to be a particularly suitable material for the plates and/or connecting tubes.

To improve the thermal conductivity of the heater according to the invention, it is proposed that at least one of the plates comprise a sheet of lightweight metal, on one side of which, specifically the side oriented toward the other plate, a plastic layer is provided. Since the plastic layer is relatively thin, a high thermal transfer is attained overall, taken together with the metal plate. Alternatively, the heater according to the invention may be embodied by plates comprising a plastic mixed together with metal particles, preferably aluminum flakes.

A particular advantage of the heat exchanger according to the invention is that any arbitrary embodiment can be manufactured simply and can be adapted to the shape of the vehicle body.

Further objects, features and advantages of the present invention will become apparent from the description of preferred embodiments which follows, when considered together with the attached figures of drawing.

DESCRIPTION OF THE PREFERRED EMBODIMENTS

Figure 1:
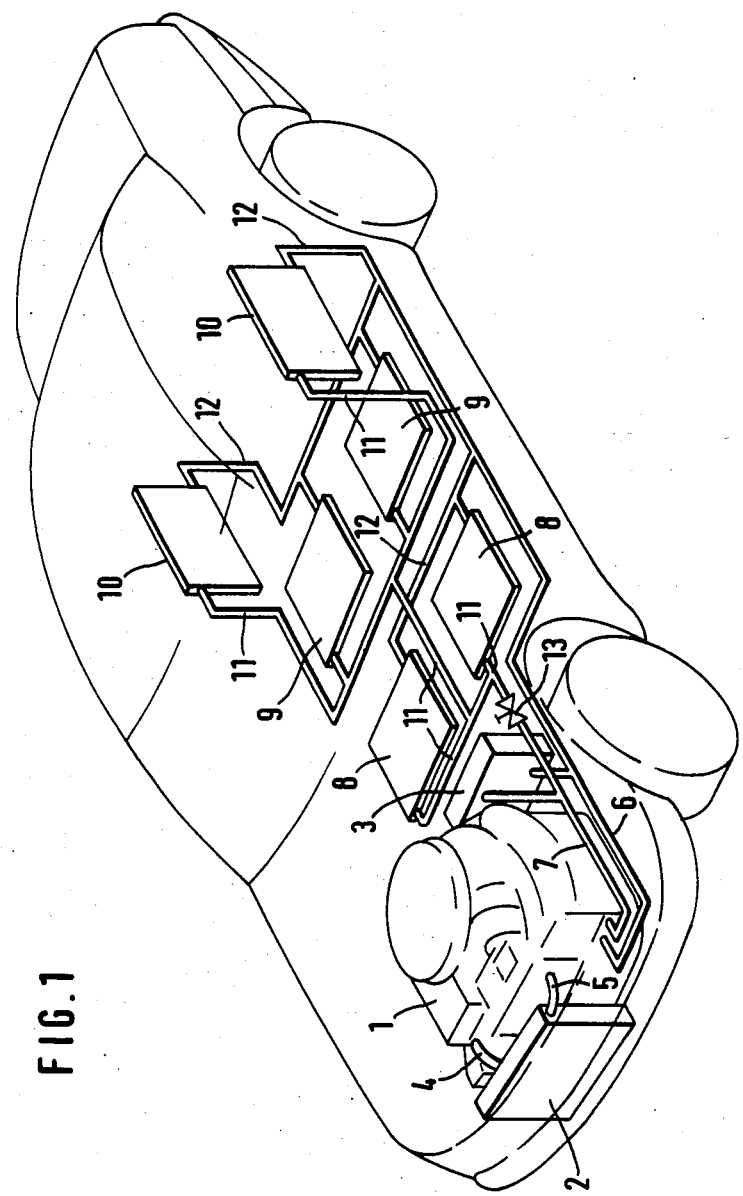
FIG. 1 shows a schematic illustration of the disposition of plate-type heaters in a passenger vehicle.

FIG. 1 shows a silhouette of a passenger vehicle in which 1 represents an engine, 2 a radiator and 3 a heater of the vehicle heating system. The engine 1, the radiator 2, and the heater 3 embody, in the conventional manner, the elements of a coolant circuit which communicate with one another via connecting lines 4, 5, 6, and 7. The feed line of the heater 3 is indicated as 7 and the return line of the heater 3 is indicated as 6.

Plate-type heaters 8 and 9 are disposed on the floor of the vehicle, in the region in front of the front seats and in front of the rear seats. A plate-type heater 10 is also shown, located in the side wall of the motor vehicle, again in the vicinity of the rear seats. Plate-type heaters 8, 9, and 10 communicate via feed lines 11 with the feed line 7 of heater 3 and via return lines 12 with return line 6 of heater 3. A valve means 13 is included in the feed line 11 for the plate-type heaters 8, 9, and 10, so that the flow of the heating medium through the plate-type heaters 8, 9 and 10 can be controlled.

The plate-type heaters may also be disposed in a secondary circuit, that is, one in which a fluid different from the coolant flows through them.

Figure 2:
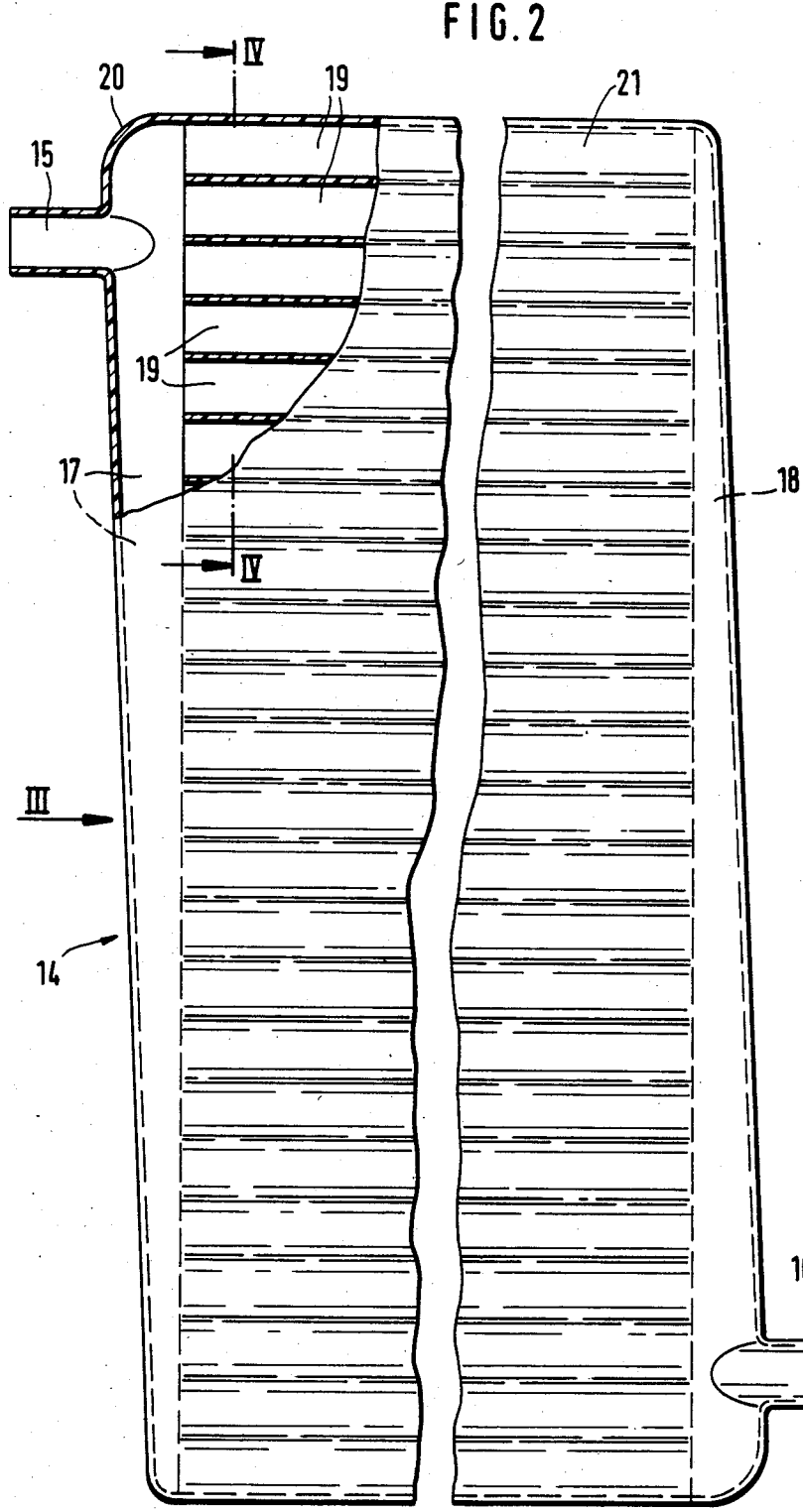
FIG. 2 shows a plate-type heater having a number of parallel channels (seen partially in section)

In FIG. 2, a plate-type heater 14, which is provided with an inflow pipe 15 and an outflow pipe 16, is shown. The plate-type heater 14 comprises two plastic plates 20 and 21, embodied and joined together in mirror-image fashion. The wall thickness of the plates 20 and 21 is preferably 1.0 mm. On one end, the plate-type heater 14 has a distributing chamber 17, into which the inflow pipe 15 discharges, and on the other end a collecting chamber 18 which connects to the outflow pipe 16. A number of parallel indentations 19, which form the channels for the heating medium, extend between the distributing chamber 17 and the collecting chamber 18.

Figure 3:
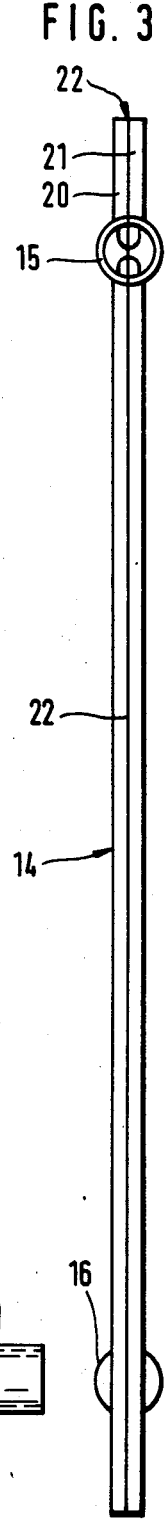
FIG. 3 shows view III of FIG. 2.

FIG. 3 is a side view along the arrow III in FIG. 2. This view shows the two plates 20 and 21, which together form the very flat plate-type heater 14. The inflow pipe 15 may be seen in the upper portion, and the outflow pipe 16, located on the opposite side, is disposed in the lower portion of the plate-type heater 14. The two plates 20 and 21 are joned at the parting plate 22 by welding.

Figure 4:
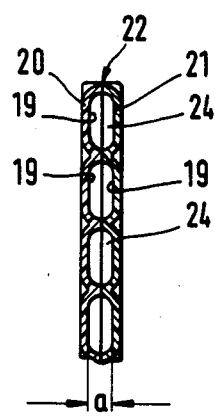
FIG. 4 shows a section taken along the line IV—IV of FIG. 2.

FIG. 4 shows a section taken along the line IV—IV of FIG. 2. It is apparent from this view that the plates 20 and 21 are exactly identical, and each of the plates has indentations 19 opposing one another in mirror-image fashion, with each two facing indentations 19 together forming one channel 24. The indentations 19 of the plates 20 and 21 have an elongated cross-sectional shape, so that the channels 24 formed by each two facing indentations 19 have an elliptical or oval cross-sectional shape, with the shorter axis a of the oval extending at right angles to the plane of the plates 20 and 21. Between each two adjacent channels 24, the plates 20 and 21 meet at the parting plane 22 and are also welded to one another at this point. The distance between two adjacent channels is approximately equal to the wall thickness of the plates 20, 21.

Figure 5:
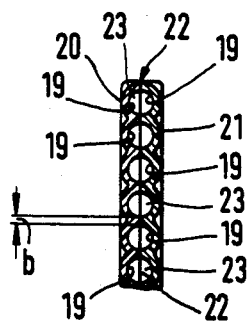
FIG. 5 shows a variant embodiment of that shown in FIG. 4.

FIG. 5 shows a variant of the embodiment in FIG. 4, in which the indentations 19 are semicircular in shape, with the result that the indentations of the plates 20 and 21, when the plates are welded together, form channels 23 having a circular cross section.

Figure 6:
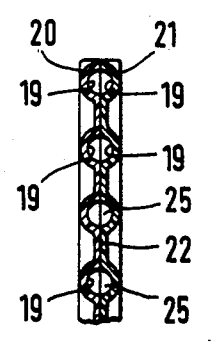
FIG. 6 shows a further variant embodiment of that shown in FIG. 4.

In FIG. 6, a variant of the embodiment in FIG. 4 is shown in which the two plates 20 and 21 have similar indentations 19 to those of FIG. 4. In contrast to the embodiment described above, however, in FIG. 6 the respective adjacent indentations 19 of a plate are spaced apart from one another by a distance c. The distance c is approximately seven times as large as the wall thickness of the plates 20 and 21. In this manner, a relatively large connecting surface area is attained at the parting plane 22 between the individual channels 25, which are formed by each two opposing indentations 19 of the plates 20 and 21.

Figure 7:
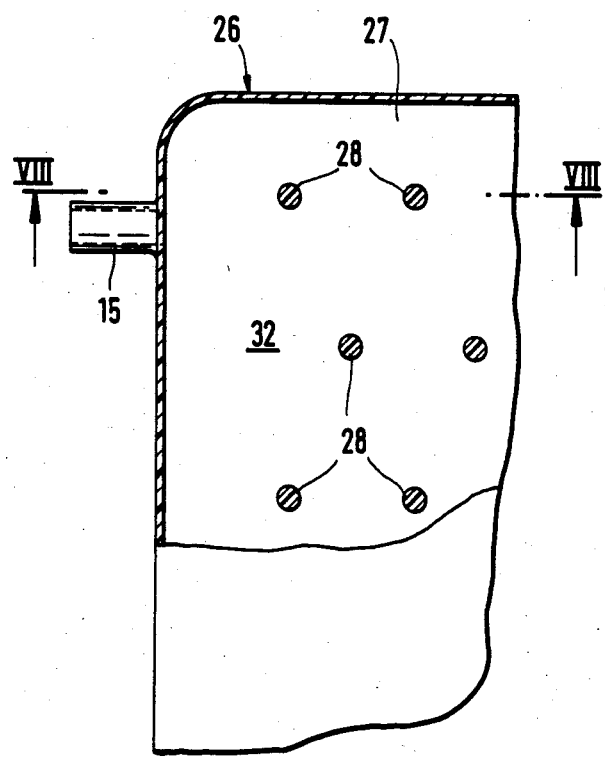
FIG. 7 shows a variant embodiment of that shown in FIG. 2 (detail)

In FIG. 7, a detail of a variant of the embodiment of FIG. 2 is shown, in which a first plate 26 has only one indentation 27, extending over virtually the entire surface area of the plate; thus the plate 26 has substantially the shape of a flat pan. The plate 26 is provided with a number of projections 28 oriented toward a second plate (not shown in FIG. 7). The projections 28 have a height such that the second plate is supported on them and welded to them. By means of this embodiment of the sole indentation 27 as well as of the projections 28, distributing and collecting chambers such as are described in FIG. 2, for instance, are not necessary, because a single channel with a large surface area 32 is formed.

Figure 8:
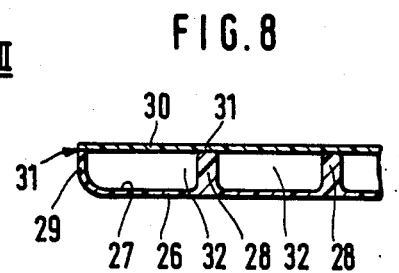
FIG. 8 shows a section taken along the line VIII—VIII of FIG. 7.

FIG. 8 shows a section taken along the line VIII—VIII of FIG. 7. From this view, it is apparent that the lower first plate 26 has the shape of a flat pan, in which a number of projections 28 are disposed, which have the same height as a lateral rim 29. The lower first plate 26 is covered by a flat second plate 30, and the two plates 26 and 30 are welded to one another at the contact surfaces located in the plane of separation 31. A modification of the embodiment in FIGS. 7 and 8 is also possible, using two plates embodied in mirror-image fashion.

Figure 9:
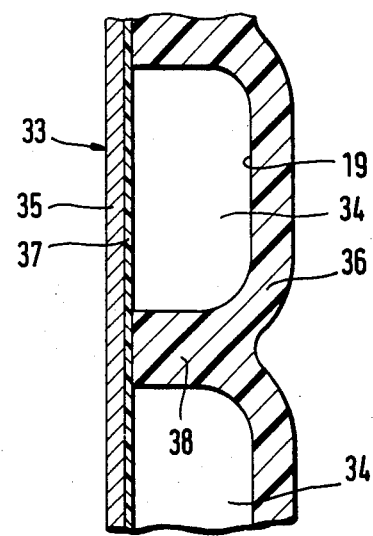
FIG. 9 shows an enlarged illustrations of a detail of a plate-type heater made of a different combination of materials.

In FIG. 9, a detail of a plate-type heater is shown, which comprises one plastic plate 36 having indentations 19 disposed between ribs 38, and one flat plate 33 resting on the ribs 38. The plate 33 is formed from a lightweight metal body 35, preferably of aluminum, and a thin plastic layer 37, the plastic layer 37 being located on the side facing the ribs 38. At the contact surfaces, the two plates 36 and 33 are welded together; between the two plates, channels 34 for the passage of the heat exchanger fluid are formed by means of the indentations 19.

Figure 10:
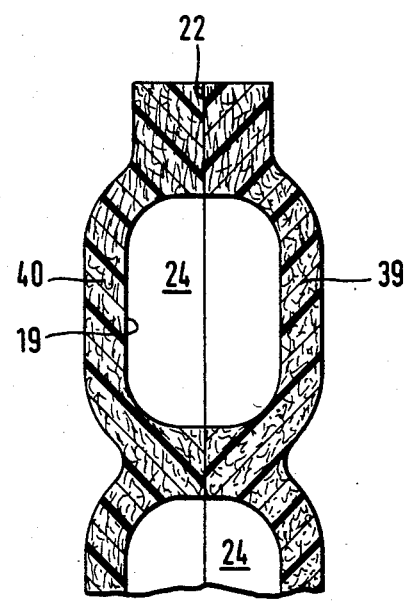
FIG. 10 shows a variant embodiment of that shown in FIG. 4, seen on a larger scale.

FIG. 10 shows a variant of the embodiment in FIG. 4. Here there are two plates 39 and 40, which in terms of their shape correspond to those of FIG. 4; but, in contrast to those plates, are made not of a pure plastic material. The plates 39 and 40 are instead formed from plastic, such as polypropylene, with interspersed metal particles. This plastic is one with an admixture of, for example, aluminum or copper particles, in the shape of balls or flakes. Aluminum flakes having a length of 2 mm and a thickness of 50 μm are particularly suitable; the filler material should amount to 30 to 35% by weight. A plastic plate 39, 40 of this type, having metal particles, has a substantially better thermal conductivity than plates of pure plastic; in the example given here, it is approximately four times as high. The plates 39 and 40 have indentations 19 and are welded to one another in the vicinity of the parting plane 22. Channels 24 for the passage of the heat exchanger fluid are formed by means of the indentations 19.

The above-described plate-type heater can serve both as a supplementary heat source in addition to a conventional vehicle heating system, and also as a sole heating system for a motor vehicle. Taking FIG. 1 as an example, the latter alternative would mean that the heater 3 would be omitted, and all heating would be effected by heaters 8, 9, and 10.

What is claimed is:

1. A heater installed on the floor or in one side wall of a passenger compartment of a motor vehicle having an engine cooled by a coolant system utilizing a circulating liquid cooling medium, comprising:
a generally flat heater unit including:
   a first rigid plate comprising a layer of light-weight sheet metal having a layer of plastic material on at least one surface thereof;
   a second rigid plate comprised of a plastic material firmly joined to the surface of the first rigid plate on which said layer of plastic material is located;
   at least one channel for a liquid medium, disposed between the plates and including at least one indentation in said second plate;
means, including an inflow pipe connected to said heater unit, for supplying the heater unit with coolant from the cooling system of the engine; and
means, including an outflow pipe connected to said heater unit, for returning cooling medium to the cooling system of the engine, wherein the channel extends from the inflow pipe to the outflow pipe.

2. A heater according to claim 1, wherein one of said first and second plates comprises a plurality of projections for supporting the other of said plates.

3. A heater according to claim 1, wherein said channel comprises a plurality of parallelly extending indentations, and collecting chambers disposed on the ends of the indentations.

4. A heater according to claim 1, wherein said plates have corresponding indentations, and wherein said heater comprises a plane of symmetry between said plates.

5. A heater according to claim 4, wherein said channel has a substantially circular cross section.

6. A heater according to claim 4, wherein said channel has a substantially oval cross section, and wherein a short axis of the substantially oval cross section extends generally perpendicular to said first and second plates.

7. A heater according to claim 3, wherein a distance between said indentations corresponds approximately to a wall thickness of said plates.

8. A heater according to claim 3, wherein a distance between said indentations is substantially greater than a wall thickness of said plates.

9. A heater according to claim 1, wherein said plates comprise a wall thickness from about 0.8 mm to about 10 mm.

10. A heater according to claim 1, further comprising a weld firmly joining said first and second plates.

11. A heater according to claim 1, further comprising:
a plastic feed tube, welded to said inflow pipe; and
a return tube, welded to said outflow pipe.

12. A heater according to claim 11, wherein said feed and return tubes comprise high-pressure, cross-linked polyethylene.

13. A heater according to claim 10, wherein said plates comprise high-pressure, cross-linked polyethylene.

14. A heater according to claim 1, wherein said second plate comprises means, comprising metal particles mixed with said plastic material, for increasing the thermal conductivity of said plate.

15. A heater according to claim 14, wherein said metal particles comprise aluminum flakes.

16. A heater according to claim 1, wherein said plates have a polygonal shape.

17. A heater according to claim 1, wherein said plates comprise at least one rounded corner.

18. A heater according to claim 1, wherein said heater comprises a cross sectional shape in one direction of its length corresponding substantially to a convex-concave lens.

19. A motor vehicle, comprising abody having a floor and sidewalls, and a heater installed in at least one of said floor and sidewalls, wherein the heater comprises a heater as defined by claim 1.

* * * * *